3,393,195
1,2,3,6,7,11b-HEXAHYDRO-4H-PYRAZINO-
2,1-a-ISOQUINOLINES
Jan Thesing, Georg Seitz, Rolf Pohlke, Siegmund Sommer, and Helmut Müller-Calgan, Darmstadt, Germany, and Manfred Götz, Pointe Claire, Quebec, Canada, assignors to E. Merck Aktiengesellschaft, Darmstadt, Germany
No Drawing. Filed Jan. 26, 1965, Ser. No. 428,229
Claims priority, application Germany, Feb. 6, 1964,
M 59,832
8 Claims. (Cl. 260—268)

This invention relates to novel isoquinoline derivatives, in particular to such derivatives having pharmacological properties.

Accordingly, a principal object of this invention is to provide novel derivatives of isoquinoline.

Another object is to provide processes for the preparation of these novel compounds.

Still another object is to provide novel pharmaceutical compositions and methods of effecting pharmaceutical activities.

To attain the objects of this invention, there are provided 1,2,3,6,7,11b-hexahydro - 4H - pyrazino[2,1-a]-isoquinolines of Formula I, as follows:

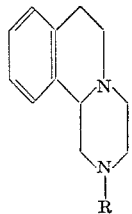

wherein
R represents alkyl or alkanoyl of 1–7 carbon atoms, aralkyl of 7 or 8 carbon atoms, phenyl, or benzoyl, wherein each of these residues can be mono- or poly-substituted by fluorine, chlorine, bromine, OH, $NH_2$, or by alkoxy, alkenyloxy, alkynyloxy, alkylamino, alkanoyloxy, or alkylcarboxamidino of respectively 1–7 carbon atoms, or by cyclic or acyclic dialkylamino of 2–12 carbon atoms, or by cycloalkyl of 3–6 carbon atoms, or by phenyl, or by benzoyloxy of a total of 7–10 carbon atoms which may, if desired, be substituted, or by guanidino, or by aminocarbonyl, or by methyl- or ethylmercapto; and wherein R can further represent hydrogen, alkenyl or alkynyl of 2–4 carbon atoms, cycloalkyl of 3–6 carbon atoms, cinnamoyl, picolinoyl, nictotinoyl, isonicotinoyl, pyrazinoyl, aminocarbonyl, methyl- or phenyl-aminocarbonyl, α-iminoalkyl of 1–6 carbon atoms, or guanyl, as well as their acid addition salts and quaternary ammonium salts.

The novel compounds of Formula I possess very valuable pharmacological properties. They all exhibit, in general, an effect on the central nervous system, for example, a depressive (narcosis-potentiating, sedative and/or tranquilizing and neuroleptic) effect.

As an example of the pharmacological properties of the drugs, the following relationships in comparison with meprobamate, a brand of 2-methyl-2-propyl-1,3-propane-diol dicarbamate, resulted when using oral administration to rats in the hexobarbital narcosis test:

| Compound I, R= | Effectiveness related to meprobamate=1 |
|---|---|
| Hydrogen | 15 |
| Pyrazinoyl | 10 |
| Propargyl | 10 |
| Methyl | 8 |
| Isopropyl | 8 |
| n-Propyl | 4 |
| Veratroyl | 4 |

In the hexobarbital narcosis test, 10 female rats (weight 130–280 g.) are orally fed graded quantities of the test substances (suspended in a solution of gum arabic), after having been without food for 20 hours. Simultaneously, a group of 10 control animals receives orally a 5% gum arabic solution. After 45 minutes, all animals receive hexobarbital-sodium intravenously (20 mg./kg.). The animals are positioned on their backs on heated troughs. The duration of narcosis of the animals is determined with the aid of two criteria (head raising and turning from supine to prone position), and this duration of narcosis of the two groups of animals is compared. The definition for the minimal effective dosage of the test substances is the lowest dosage at which a distinct difference in effect occurs in comparison to the control animals (ensured statistically by means of the Mann-Whitney test).

According to the invention, the compounds of Formula I can be produced by converting, in one or several steps, a compound of Formula II

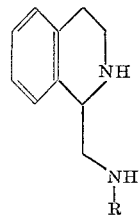

wherein R has the previously indicated meaning, into the corresponding 1,2,3,6,7,11b - hexahydro - 4H - pyrazino-[2,1-a]isoquinoline of Formula I by reacting it with a 1,2-di-X-ethane derivative (the residues X are identical or different, and represent residues which can be exchanged for an amino group). If desired, the residue R in this corresponding isoquinoline of Formula I can be converted into another residue R by treatment with alkylating, acylating, amidinating, or saponifying agents, or, if desired, the compounds of Formula I can be converted into physiologically compatible acid addition salts by treating with acid, or into physiologically compatible quaternary ammonium salts by treating with alkylating agents.

In particular, the compounds of Formula I can be produced by converting 1-aminomethyl-1,2,3,4-tetrahydro-isoquinoline (A) in one or two steps, into 1,2,3,6,7,11b- hexahydro-4H-pyrazino-[2,1-a]-isoquinoline (I, R=H) by means of a 1,2-di-X-ethane derivative (X having the previously indicated meaning), and, if desired, then alkylating, acylating, or amidinating the obtained compound in the 2-position.

The starting material, 1 - aminomethyl-1,2,3,4-tetrahydroisoquinoline (A), as well as the corresponding 1-acylamidomethyl-1,2,3,4-tetrahydroisoquinolines can be produced according to the process described in "Journal of the American Chemical Society" vol. 71, p. 3405 (1949). The remaining starting compounds of Formula II can also be produced from A, or from the 1-acylamidomethyl compounds, by conventional methods. For example, a reduction of the 1-acylamidomethyl compounds with lithium aluminum hydride leads to 1-alkyl- or 1-aralkylaminomethyl-1,2,3,4-tetrahydroisoquinolines.

A compound of Formula II, particularly A, can be converted into the 1,2,3,6,7,11b-hexahydro-4H-pyrazino-[2,1-a]-isoquinoline of Formula I by reaction with a 1,2-di-X-ethane derivative. The following compounds, for example, can serve as the 1,2-di-X-ethane derivative: 1,2-dibromoethane, 1,2-dichloroethane, 1,2-diiodoethane, 1-chloro-2-bromoethane, 1-chloro-2-iodoethane, 1-bromo-2-iodoethane, ethylene glycol, 2-chloroethanol, 2-bromoethanol, 2-iodoethanol, ethylene oxide, ethylene carbonate, and ethylene sulfite.

The reaction of these compounds with A is conducted in the manner conventional for nitrogen alkylations. If halogen compounds are used, the reaction is preferably conducted with equimolar proportions and in the presence of a base, such as sodium or potassium hydroxide, sodium or potassium carbonate, triethylamine, or pyridine. The reaction can be conducted without solvents; on the other hand, it is also possible to operate in the presence of an additional solvent, such as methanol, ethanol, benzene, acetonitrile, or water.

The reaction is preferably conducted with heating, if desired up to the boiling point of the solvent used, and is preferably terminated after 10 minutes to 5 hours. For example, the reaction of Formula II with ethylene glycol in the presence of Raney nickel is advantageously conducted at higher temperatures (up to 300° C.) and also at higher pressures (up to 200 atmospheres). Additionally, when reacting one of the above-mentioned cyclic ethylene derivatives with Formula II, a reaction at increased temperature is recommended.

It is also possible to conduct the conversion of II, particularly of A, into I in several steps. First, A can be reacted with a 1,2-di-X-ethane derivative having a higher degree of oxidation than the above-mentioned ethane derivatives, this reaction either being conducted under reducing conditions, or the reduction being subsequently conducted. Such reactions can, for example, be conducted with oxalic acid or its funtional derivatives, predominantly its lower alkyl esters, such as the dimethyl or diethyl ester of oxalic acid; oxalyl chloride or oxalyl bromide; mono-esters of oxalic halogenides, such as the monomethyl or monoethyl ester of oxalic chloride; dicyanogen; chloro-, bromo-, or iodoacetic acids and their derivatives, such as chloroacetyl chloride, bromoacetyl bromide; alkyl esters of chloro-, bromo-, or iodoacetic acid, such as the methyl or ethyl ester of chloroacetic acid, the methyl or ethyl ester of bromoacetic acid; chloroacetonitrile or bromoacetonitrile; glycolic acid or glyoxylic acid and their functional derivatives; chloro-, bromo-, or iodoacetaldehyde; glycolic aldehyde; or glyoxal; and their functional derivatives, such as chloroacetaldehyde diethyl acetal, bromoacetaldehyde diethyl acetal, or glyoxal tetra-alkyl-acetals.

The reaction conditions for the preceding reactions approximately correspond to the previously mentioned conditions, with expected variations depending upon the reactivity of the functional groups present in the ethane derivatives. For example, the reaction with the readily reactive oxalyl chloride is conducted under relatively mild conditions in the cold state, whereas the reaction with oxalic ester commences spontaneously at room temperature, but is completed under heating. The above-mentioned solvents can also be used for these reactions.

The reduction of the obtained intermediates in which the ring system of I is already present is conducted in various ways, depending upon the nature of these intermediates. Carbonyl groups which are present in the intermediate products can readily be reduced to methylene groups by means of complex hydrides, for example, such as lithium aluminum hydride. The intermediate product is dissolved in ether, tetrahydrofuran, or dioxane, and is refluxed for 1–8 hours with the hydride. The working up operation is carried out conventionally, after previously decomposing excess hydride.

It is also possible to hydrogenate the obtained intermediate catalytically. Preferably, copper chromic oxide catalysts are used, and the reaction is conducted at higher temperatures (up to 400° C.) and at higher pressures (up to 300 atmospheres); the solvents which are used can be inert organic, preferably lower, alcohols.

In multi-step conversions of A into I (R=H), it can be of advantage to block certain functional groups of the molecule by means of protective residues which are later removed. For example, a 1-acylamidomethyl-1,2,3,-4-tetrahydroisoquinoline, preferably the benzamido derivative, can be reacted with ethylene oxide, thereby producing a 1-acylamidomethyl-2-(2'-hydroxyethyl)-1,2,3,-4-tetrahydroisoquinoline. The acyl group is split off, for example, by heating with aqueous mineral acid. The hydroxy group is then replaced by a chlorine or bromine atom, by reaction with, for example, thionyl chloride or hydrobromic acid; and, finally the obtained 1-aminomethyl-2-(2'-haloethyl)-1,2,3,4-tetrahydroisoquinoline is converted into the desired compound I (R=H) with the aid of an organic or inorganic base, hydrogen halide being split off.

The reaction conditions of each individual step of the above set forth reaction sequence are not critical, and a person skilled in the art can easily develop further multi-step syntheses of I (R=H) from A, based on the teachings of this invention.

In the thus-obtained 1,2,3,6,7,11b-hexahydro-4H-pyrazino-[2,1-a]-isoquinoline of Formula I, the residue R can be converted into another residue R according to methods encompassing one or several steps. In particular, it is possible, in the compound 1,2,3,6,7,11b-hexahydro-4H-pyrazino-[2,1-a]-isoquinoline itself (I, R=H), to convert the hydrogen atom of the secondary amino group into another residue R by alkylation, acylation, amidination, or by equivalent methods, for example by guanidination.

In the definition of the residue R, alkyl can for example have the following meanings: methyl, ethyl, propyl, isopropyl, n-butyl, isobutyl, sec. butyl, tert. butyl, n-amyl, isoamyl, n-hexyl, isohexyl, n-heptyl; alkanoyl represents residues such as formyl, acetyl, propionyl, butyryl, isobutyryl, trimethylacetyl, valeryl, isovaleryl, caproyl, isocaproyl, enanthoyl; aralkyl represents benzyl, 1- or 2- phenylethyl; alkenyl and alkynyl residues can be the following: vinyl, allyl, propen-(1)-yl, butenyl, ethynyl, propargyl, butynyl; cycloalkyl residues can be: cyclopropyl, cyclobutyl, cyclopentyl, or cyclohexyl. Among the α-iminoalkyl residues, the following are mentioned: iminomethyl, α-iminoethyl, α-iminopropyl, α-iminobutyl, α-iminopentyl, α-iminohexyl. Alkoxy residues are preferably: methoxy, ethoxy, propoxy, isopropoxy, butoxy, isobutoxy, amyloxy, isoamyloxy; alkenyloxy residues are: vinyloxy and allyloxy; alkynyloxy residues are: ethynyloxy and propargyloxy; alkylamino residues are: methyl-, ethyl-, propyl-, isopropyl-, butyl-, isobutyl-, amyl-, and hexylamino. Preferred dialkyl-amino groups are: dimethyl-, methylethyl-, diethyl-, dipropyl-, and dibutylamino, as well as pyrrolidino, piperidino, morpholino, and N-methylpiperazino. The preferred alkanoyloxy groups are particularly formyloxy, acetoxy, propionyloxy, butyryloxy, isobutyryloxy, trimethylacetoxy, valeryloxy, isovaleryloxy, caproyloxy, isocaproyloxy, and enanthoyloxy. Preferred alkylcarboxamidino residues (alkyl-C(=NH)—NH—) are those which correspond to the above-mentioned alkanoyloxy groups, but the most preferred one is the acetamidino group. Benzoyloxy groups are substituted, if desired, especially by alkoxy of a total of 1–3 carbon atoms, preferably by one or several methoxy groups.

According to its definition, the residue R for example represents: haloalkyl, such as 2-chloroethyl; halophenyl, such as fluoro-, chloro-, or bromophenyl; hydroxyalkyl, such as 2-hydroxyethyl; alkoxyalkyl, such as 2-methoxyethyl, 2 - methylmercaptoethyl, 2 - ethylmercaptoethyl; aminoalkyl, such as 2 - aminoethyl, 3 - aminopropyl, 2 - methylaminoethyl, 2 - dimethylaminoethyl, 2 - diethylaminoethyl, 2 - methylethylamino - ethyl, 2 - pyrrolidinoethyl, 2 - piperidinoethyl, 2 - morpholinoethyl, 2 - (4' - methylpiperazino) - ethyl, 3 - dimethylaminopropyl, 3 - diethylaminopropyl, 3 - (4' - methylpiperazino) - propyl; carbomethoxy; carbethoxy; aminocarbonylmethyl; acyloxyalkyl, such as 2 - acetoxyethyl, 2 - enanthoyloxyethyl, 2 - benzoyloxyethyl, 2 - (3',4'-dimethoxybenzoyloxy) - ethyl, 2 - (3',4',5' - trimethoxybenzoyloxy) - ethyl, 2 - 3',4' - dimethoxyphenyl) - ethyl; 2 - acetamidinoethyl; 2 - guanidinoethyl; haloacyl, such as mono-, di-, or trifluoroacetyl, mono-, di-, or trichloroacetyl; and mono-, di-, or trialkoxybenzoyl, such as 3',4' - dimethoxybenzoyl or 3',4',5' - trimethoxybenzoyl. Furthermore, R can stand for radicals such as the following: fluoromethyl, 4 - bromobutyl - (1), 2 - heptyloxyethyl, 2 - allyloxyethyl, 2 - propargyloxyethyl, 2 - (6-hepten - 1 - yloxy) - ethyl, 2 - (6 - heptyn - 1 - yloxy)-ethyl, 2 - heptylaminoethyl, formyloxymethyl, formamidinomethyl, cyclopropylmethyl, bromoacetyl, hydroxyacetyl, aminoacetyl, 4 - heptyloxy - butyryl, methoxyacetyl, enanthoyloxyacetyl, methylaminoacetyl, β - enanthoylamidino - propionyl, 2 - perhydrocarbazolylethyl, pyrrolidinocarbonyl, diethylaminoacetyl, phenylacetyl, β - phenyl - propionyl, cyclohexylacetyl, β - cyclohexyl - propionyl, β - cyclopentyl - propionyl, cyclopropyl - carbonyl, benzoyloxyacetyl, guanidinoacetyl, β - aminocarbonyl - propionyl, β - methylmercaptopropionyl, ethylmercapto - acetyl, o-, m- or p-fluoro-, -chloro- or -bromobenzyl, o-, m- or p - hydroxybenzyl, 2 - (o-, m- or p - aminophenyl) - ethyl, o-, m- or p-hydroxyphenyl, o-, m- or p - aminophenyl, o-, m- or p-methoxyphenyl, dimethoxyphenyl, o-, m- or p - ethoxyphenyl, o-, m- or p - heptylaminophenyl, o-, m- or p-dihexylamino - phenyl, o-, m- or p - trifluoromethylphenyl, o-, m- or p - methyl - mercapto - phenyl, o-, m- or p - fluoro-, chloro-, -bromo-, -hydroxy- or -aminobenzoyl.

For introducing the R residues, the corresponding alkyl-, aralkyl-, or acyl-halogenides are used, for example, or the free alcohols or carboxylic acids, or their reactive derivatives can also be used, for example the acid anhydrides. For introducing the aminocarbonyl groups, a reaction is conducted with salts of cyanic acid; and for introducing substituted aminocarbonyl groups, a reaction is conducted with methyl- or phenyl-isocyanate; in this manner, substituted ureas are obtained. If the compound I (R=H) is reacted with nitriles, amidines result (I, R=α-iminoalkyl); if cyanamide, guanidine, or guanidine salts are used, substituted guanidines (I, R=guanyl) result.

All these reactions can be conducted in the manner described regarding N-alkylation, N-acylation, amidine-formation, and guanidine-formation, in accordance with the methods set forth in Houben-Weyl, "Methoden der Organischen Chemie" (Methods of Organic Chemistry), fourth edition, vol. VIII, pp. 180–190 (1958); vol. XI/1, pp. 24–270 and 648–664 (1957); vol. XI/2, pp. 3–69 (1958), Georg Thieme Publishers, Stuttgart, Germany; or in accordance with equivalent methods.

It is also possible to make subsequent functional changes in the R group. The expressions "alkylation," "acylation," and "amidination" shall be defined herein such that such subsequent changes are encompassed in these expressions. For example, the compound I (R=H) can first be reacted with a halo-alcohol, such as 2-chloroethanol, the corresponding β-hydroxyethyl compound resulting therefrom; the free β-hydroxy group can then be subsequently esterified in a conventional manner. It is also possible to first react the compound I (R=H) with chloroacetamide or chloroacetonitrile, and subsequently to reduce the acid amide or nitrile group, respectively, to the primary amino group. The thus-obtained free amino group can, in turn, be further modified by alkylation or reaction with nitriles or cyanamide, respectively, so that amidines and guanidines, respectively, are obtained.

It is further possible to saponify and split off saponifiable R groups, such as for example, alkanoyl or benzoyl groups, preferably by heating with acids such as hydrochloric acid, or strong bases such as sodium or potassium hydroxide. Most preferred solvents are water, lower alcohols, such as methanol or ethanol, or mixtures of water and lower alcohols.

If racemates are produced when carrying out the process of the present invention, they can be separated, if desired, into their optically active antipodes in accordance with any conventional method, for example those methods set forth in Houben-Weyl, vol. 4/2, pp. 513–519.

Finally, an amine of Formula I obtainable in accordance with the invention can be converted into acid addition salts by treatment with acids. For this purpose, inorganic or organic, for example aliphatic, alicyclic, araliphatic, aromatic, or heterocylic, mono- or poly-basic acids can be used. For pharmaceutical uses, it is of course necessary to produce physiologically compatible acid addition salts, and for this purpose there are used such acids as: mineral acids, such as hydrochloric acid, hydrobromic acid, sulfuric acid, nitric acid, or orthophosphoric acid, or organic acids, such as acetic acid, propionic acid, l-ascorbic acid, succinic acid, citric acid, gluconic acid, lactic acid, methansulfonic acid, β-hydroxy-ethanesulfonic acid, maleic acid, fumaric acid, tartaric acid, malic acid, benzoic caid, salicylic acid, naphthalene disulfonic acid, pivalic acid, ethane disulfonic acid, p-toluenesulfonic acid, as well as numerous other acids suggested in the prior art or which will occur to a skilled chemist.

Conversely, it is of course also possible to free the amine from an acid addition salt of an amine of Formula I by treatment with a base.

By treating with alkylating agents, the compounds of Formula I can be converted into quaternary ammonium salts. For physiologically compatible salts, it is preferred to use such alkylating agents having a non-toxic anion and an alkyl portion of 1 to 7 carbon atoms, such as methyl iodide, dimethyl sulfate, ethyl bromide, ethyl iodide, propyl chloride, bromide or iodide, isopropyl chloride, bromide or iodide, n-butyl chloride, bromide or iodide, heptyl bromide, benzyl chloride or bromide.

According to the invention, compounds of the following formulas are preferred, as well as their physiologically compatible acid addition salts and quaternary ammonium salts:

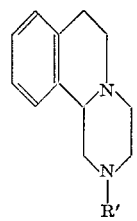

wherein R' represents hydrogen or an alkyl group of 1–3 carbon atoms;

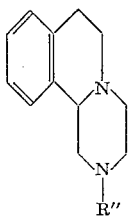

wherein R'' represents hydrogen; an alkyl, alkenyl, or alkynyl group of 1–3 carbon atoms; an aminocarbonylmethyl group; a benzoyl group which is, if desired, mono- or poly-substituted by fluorine, chlorine, bromine, OH, $NH_2$, alkoxy, alkylamino, alkanoyloxy, or alkylcarboxamidino of respectively 1–7 carbon atoms, or cyclic or acyclic dialkylamino of 2–12 carbon atoms; or a pyrazinoyl group;

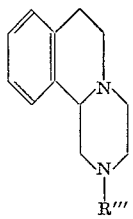

wherein R''' represents hydrogen or an alkyl, alkenyl, or alkynyl group of 1–3 carbon atoms;

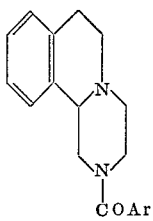

wherein Ar represents a phenyl group which is, if desired, mono- or poly-substituted by fluorine, chlorine, bromine, OH, $NH_2$; alkoxy, alkylamino, alkanoyloxy, or alkylcarboxamidino of respectively 1–7 carbon atoms; or cyclic or acyclic dialkylamino of 2–12 carbon atoms.

The compounds of the invention can be utilized in pharmaceutical compositions where they are mixed with conventional excipients. Carrier substances can be organic or inorganic substances which are suitable for parenteral or enteral application and which do not react with the compounds of the invention, such as, for example, water, vegetable oils, polyethylene glycols, gelatin, lactose, amylose, magnesium stearate, talcum, cholesterol, etc. For parenteral application, particularly solutions are suitable, preferably oily or aqueous solutions, as well as suspensions or emulsions; for enteral application, tablets or dragees are utilized. All these types of preparations can be sterilized, if desired, or can be mixed with auxiliary substances, such as preservatives, stabilizers, or wetting agents, or salts for influencing the osmotic pressure, or with buffer substances.

The novel compounds are preferably administered in dosages of between 0.1 and 100 mg.

Aside from having an important use in the pharmaceutical industry, the compounds of this invention can also be utilized as intermediates for the formation of other chemical compounds.

It is also apparent that the presence of two tertiary or quaternary amino groups in compounds of this invention makes the compounds useful as weak or strong organic bases, according to the requirements of the process wherein they are employed to adjust pH.

Thus, with respect to the utility of the compounds of this invention, it is apparent that they are generally useful as novel chemicals, and particularly useful for pharmaceutical applications.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. For example, the reaction times, temperatures, and other reaction conditions can be routinely varied by those skilled in the art.

Example 1

(a) 214 g. diethyl ester of oxalic acid are mixed with a solution of 238 g. 1-aminomethyl-1,2,3,4-tetrahydroisoquinoline in 200 ml. alcohol and are boiled for 7 hours. After cooling, the obtained crystals of 1,2,3,6,7,11b-hexahydro-4H-pyrazino-[2,1-a]-isoquinoline - 3,4 - dione are vacuum-filtered and washed with acetone. Yield: 240 g.; M.P. 220° C.

55 g. lithium aluminum hydride are dissolved in 650 ml. absolute tetrahydrofuran and mixed dropwise with a suspension of 120 g. 1,2,3,6,7,11b-hexahydro-4H-pyrazino-[2,1-a]-isoquinoline-3,4-dione in 300 ml. absolute tetrahydrofuran. After 7 hours of boiling, the residual hydride is decomposed by the addition of water, and the reaction solution is worked up. The obtained 1,2,3,6,7,11b-hexahydro-4H-pyrazino - [2,1 - a] - isoquinoline is distilled in vacuum. B.P. 98–100° C./0.01 mm. Yield: 86 g.; M.P. ethereal hydrochloric acid, the dihydrochloride, M.P. 46–48° C. This base yields, in alcoholic solution with 320° C.

(b) 16.2 g. 1-aminomethyl-1,2,3,4-tetrahydroisoquinoline and 18.7 g. ethylene dibromide are boiled for 4 hours in n-butanol, with the addition of 13.8 g. potassium carbonate. After the solvent is evaporated, the residue is treated with water, mixed with sodium hydroxide solution, and shaken out with chloroform. The chloroform solution is dried, concentrated by evaporation, and the resulting residue is distilled at 98–100° C./0.01 mm. The yield amounts to 7.5 g. The product is identical with that described under (a).

(c) 32.4 g. of 1-aminomethyl-1,2,3,4-tetrahydroquinoline and 12.4 g. ethylene glycol are heated in an autoclave for 6 hours at 200° C. with 8.0 g. Raney nickel under a hydrogen atmosphere of 4 atmospheres absolute. The catalyst is vacuum filtered and washed with alcohol; the filtrate is concentrated by evaporation, and the residue is distilled at 98–100° C./0.01 mm. The yield of 1,2,3,6,7,11b-hexahydro-4H-pyrazino-[2,1-a]-isoquinoline amounts to 5.0 g.

Example 2

36 g. 1,2,3,6,7,11b-hexahydro-4H-pyrazino-[2,1-a]-isoquinoline are heated for 3 hours to 100° C. with 18 ml. 35% formaldehyde and 13.5 g. formic acid. Thereafter, the reaction solution is cooled, mixed with a solution of sodium hydroxide, and extracted with benzene. After drying and evaporating the benzene solution, the obtained 2-methyl - 1,2,3,6,7,11b-hexahydro-4H-pyrazino-[2,1-a]-isoquinoline is distilled to yield 33 g. thereof, B.P. 90° C./0.005 mm.; dihydrochloride, M.P. 293° C.; bis-methoiodide, M.P. 250–252° C.

Example 3

8.6 g. 1,2,3,6,7,11b-hexahydro-4H-pyrazino-[2,1-a]-isoquinoline, 2.2 g. ethylene oxide, 30 ml. benzene, and 0.4 ml. water are shaken in a bomb tube for 24 hours at 100° C. The product is dissolved in alcohol and precipitated as the hydrochloride by means of ethereal hydrochloric acid. After recrystallization from methanol, the obtained 2-($\beta$-hydroxyethyl) - 1,2,3,6,7,11b - hexahydro-4H-pyrazino-[2,1-a]-isoquinoline-dihydrochloride melts at 240–241° C.; yield: 10.2 g.

3,4,5-trimethoxy benzoic ester dihydrochloride, M.P. 215° C.; veratric acid ester dihydrochloride, M.P. 268–270° C.

Example 4

17 g. 1,2,3,6,7,11b-hexahydro-4H-pyrazino-[2,1-a]-isoquinoline are dissolved in 60 ml. pyridine and mixed with 11 g. acetic anhydride. The reaction solution is left standing overnight and is concentrated by evaporation. The residue is taken up in benzene, and the benzene solution is washed with sodium carbonate solution, dried, and concentrated by evaporation. There crystallizes from alcohol 2 - acetyl - 1,2,3,6,7,11b-hexahydro-4H-pyrazino-[2,1-a]-isoquinoline-hydrochloride, M.P. 280° C.; yield: 21 g.

Example 5

13 g. 2-acetyl-1,2,3,6,7,11b-hexahydro - 4H - pyrazino-[2,1-a]-isoquinoline are dissolved in 50 ml. absolute ether and added dropwise, under stirring, to 13 g. lithium aluminum hydride in 150 ml. ether. After 6 hours of boiling, the reaction mixture is treated with water and then worked up. 2-ethyl-1,2,3,6,7,11b-hexahydro-4H-pyrazino-[2,1 - a] - isoquinoline - dihydrochloride crystallizes and melts at 288–290° C. Yield: 14 g.

In similar manner, there is obtained from 2-aminocarbonylmethyl-1,2,3,6,7,11b-hexahydro - 4H - pyrazino-[2,1-a]-isoquinoline (prepared in accordance with Example 10) the compound 2-($\beta$-aminoethyl)-1,2,3,6,7,11b-hexahydro-4H-pyrazino-[2,1-a]-isoquinoline (tris - hydrochloride, M.P. 247–249° C.), and from 1,2,3,6,7,11b-hexahydro - 2 - [3' - (4'' - methylpiperazino)-1',3'-dioxopropyl] - 4H - pyrazino-[2,1-a]-isoquinoline (produced in accordance with Example 8) the compound 1,2,3,6,7,11b-hexahydro - 2-[3' - (4'' - methylpiperazino)-propyl]-4H-pyrazino-[2,1-a]-isoquinoline (tetrahydrochloride M.P. 283–285° C.).

Example 6

12.3 g. 1,2,3,6,7,11b-hexahydro-4H-pyrazino-[2,1-a]-isoquinoline are dissolved in 75 ml. chloroform and mixed with 18.6 g. 3,4,5-trimethoxy-benzoyl chloride. After half an hour of boiling, 10 ml. triethylamine are added. The solution is boiled for 2 hours, concentrated by evaporation, mixed with solution of sodium hydroxide, and shaken out with chloroform. The compound 2-(3',4',5'-trimethoxy - benzoyl-1,2,3,6,7,11b-hexahydro - 4H - pyrazino-[2,1-a]-isoquinoline-hydrochloride is recrystallized from methanol, M.P. 242–244° C. Yield: 17 g.

Analogously, there is prepared, from 3,4-dimethoxybenzoyl chloride, 2-(3',4'-dimethoxy-benzoyl)-1,2,3,6,7,-11b-hexahydro - 4H - pyrazino-[2,1-a]-isoquinoline, M.P. 168–170° C.; hydrochloride, M.P. 248–250° C.; metho-iodide, M.P. 257° C.

Example 7

9.4 g. 1,2,3,6,7,11b-hexahydro-4H-pyrazino-[2,1-a]-isoquinoline and 6.2 g. pyrazinyl carboxylic acid are dissolved in 75 ml. pyridine, mixed with 6.8 g. phosphorus trichloride, and heated for 2 hours to 100° C. After the solvent is evaporated, the residue is mixed with solution of sodium hydroxide and shaken out with benzene. The obtained 2 - pyrazinoyl - 1,2,3,6,7,11b - hexahydro - 4H - pyrazino-[2,1-a]-isoquinoline - hydrochloride crystallizes and melts at 238–240° C.; yield: 10.2 g.

Analogously, 2-cinnamoyl-1,2,3,6,7,11b-hexahydro-4H-pyrazino-[2,1-a]-isoquinoline-hydrochloride is prepared with cinnamic acid, M.P. 262° C.

Example 8

9.4 g. 1,2,3,6,7, 11b-hexahydro-4H-pyrazino-[2,1-a]-isoquinoline and 7.2 g. of methyl ester of dichloro-acetic acid are mixed with each other, allowed to stand overnight, and heated for 2 hours to 100° C. After the excess ester is evaporated, 2-dichloracetyl-1,2,3,6,7,11b-hexahydro-4H-pyrazino-[2,1-a]-isoquinoline-hydrochloride precipitates. Yield: 8.5 g., M.P. 250° C. The free base melts at 126–128° C.

Analogously, from 3-(4'-methylpiperazino)-3-oxo-propionic acid ethyl ester (prepared from 1-methylpiperazine and malonic acid diethyl ester), there is obtained 1,2,3, 6,7,11b - hexahydro - 2 - [3' - (4'' - methylpiperazino)-1',3' - dioxopropyl] - 4H - pyrazino-[2,1-a]-isoquinoline.

Example 9

18.8 g. 1,2,3,6,7,11b - hexahydro - 4H - pyrazino-[2,1-a]-isoquinoline and 6.15 g. n-propyl bromide are allowed to stand for 2 days at room temperature; then, they are heated for 2 hours to 100° C., and cooled. The precipitated crystals are washed several times with benzene; the benzene solutions are then combined and concentrated by evaporation. The distillation of the residue yields 8.0 g. of 2-n-propyl-1,2,3,6,7-11b-hexahydro-4H-pyrazino-[2,1-a]-isoquinoline, B.P. 118–119° C./0.005 mm.; dihydrochloride, M.P. 267° C.

The same compound is also synthesized by hydrogenating 2 - propargyl - 1,2,3,6,7,11b-hexahydro-4H-pyrazino-[2,1-a]-isoquinoline (obtained in accordance with Example 10) on 5% palladium charcoal in aqueous ethanol 1:1).

Example 10

7.3 g. 1,2,3,6,7,11b-hexahydro-4H-pyrazino-[2,1-a]-isoquinoline are boiled for 6 hours in 100 ml. benzene with 4.6 g. allyl bromide and 5.7 g. potassium carbonate. Thereafter, water is added, the benzene layer is separated, and the mixture is concentrated by evaporation. The compound 2 - allyl - 1,2,3,6,7,11b - hexahydro - 4H-pyrazino-[2,1-a]-isoquinoline crystallizes as the dihydrochloride, M.P. 254–255° C. Yield: 7.1 g.

Analogously, there are obtained:

With propargyl bromide, 2 - propargyl - 1,2,3,6,7,11b-hexahydro - 4H - pyrazino - [2,1-a] - isoquinoline-dihydrochloride, M.P. 244° C.;

With isopropyl bromide, 2 - isopropyl - 1,2,3,6,7,11b-hexahydro - 4H - pyrazino - [2,1-a] - isoquinoline-dihydrochloride, M.P. 276–278° C.;

With $\beta$-methylmercaptoethyl bromide, 2-($\beta$-methylmercaptoethyl) - 1,2,3,6,7,11b - hexahydro - 4H - pyrazino-[2,1-a]-isoquinoline; dihydrochloride, M.P. 248–250° C.;

With 3 - diethylaminopropyl chloride, 2 - (3' - diethylaminopropyl) - 1,2,3,6,7,11b - hexahydro - 4H - pyrazino - [2,1-a] - isoquinoline; trihydrochloride, M.P. 266° C.;

With chloracetamide, 2-aminocarbonylmethyl-1,2,3,6, 7,11b - hexahydro-4H - pyrazino - [2,1-a]-isoquinoline, M.P. 156–158° C.; dihydrochloride, M.P. 275° C.;

With 2 - (3',4' - dimethoxyphenyl) - ethyl bromide, 2-($\beta$ - 3',4' - dimethoxyphenylethyl) - 1,2,3,6,7,11b - hexahydro - 4H - pyrazino - [2,1-a] - isoquinoline, M.P. 93° C.;

With 2-dimethylaminoethyl bromide, 2-(2'-dimethylaminoethyl) - 1,2,3,6,7,11b - hexahydro - 4H - pyrazino-[2,1-a]-isoquinoline; trihydrochloride, M.P. 260–262° C. This latter compound is also obtained by reacting 2-($\beta$-aminoethyl) - 1,2,3,6,7,11b - hexahydro - 4H - pyrazino-[2,1-a] - isoquinoline with formaldehyde and formic acid.

Example 11

10.4 g. 1,2,3,6,7,11b - hexahydro - 4H - pyrazino - [2, 1-a]-isoquinoline-hydrochloride with 2.8 g. cyanamide are agitated in 75 ml. alcohol in a bomb for 28 hours at 125° C. During cooling, there crystallize 9.5 g. 2-guanyl-1,2,3,6,7,11b - hexahydro - 4H - pyrazino - [2,1-a] - isoquinoline as the dihydrochloride; recrystallization from methanol yields a purified compound melting at 283–285° C.

Analogously, from 2-aminoethyl-1,2,3,6,7,11b-hexahydro-4H-pyrazino-[2,1-a]-isoquinoline, there is produced 2 - $\beta$ - guanidinoethyl - 1,2,3,6,7,11b - hexahydro - 4H-pyrazino - [2,1-a] - isoquinoline-trihydrochloride, M.P. 267° C.

Example 12

14.1 g. 1,2,3,6,7,11b - hexahydro - 4H - pyrazino - [2, 1-a]-isoquinoline are dissolved in 60 ml. benzene and mixed with 9.0 g. phenyl isocyanate. After the reaction has diminished in intensity, the reaction mixture is briefly heated to the boiling point, and then vacuum filtered. The thus-obtained 2 - N - phenylaminocarbonyl - 1,2,3,6,7, 11b - hexahydro - 4H - pyrazino - [2,1-a] - isoquinoline is washed with acetone, further purification being unnecessary; M.P. 207° C. The yield amounts to 21 g.

Example 13

14.4 g. 1,2,3,6,7,11b - hexahydro - 4H - pyrazino - [2, 1-a]-isoquinoline are dissolved in 5% hydrochloric acid and mixed with an excess of potassium cyanate. An oil is at first precipitated which crystallizes after a short time. The obtained 2 - aminocarbonyl - 1,2,3,6,7,11b - hexahydro - 4H - pyrazino - [2,1-a] - isoquinoline is vacuum filtered, washed with water, and recrystallized from methanol, M.P. 200° C.; yield: 10 g. Hydrochloride, M.P. 228° C.

Example 14

9.4 g. 1,2,3,6,7,11b - hexahydro - 4H - pyrazino - [2, 1-a]-isoquinoline are dissolved in 8.2 g. acetonitrile and mixed gently with 13.3 g. aluminum chloride. After the reaction has died down, there are again added 8.2 g. acetonitrile, and the reaction mixture is heated to 170° C.—the excess acetonitrile being evaporated during this last-mentioned heating step. The residue is dissolved in dilute hydrochloric acid, made alkaline, and extracted with benzene. The benzene is removed by evaporation, and 2 - (1' - imidoethyl) - 1,2,3,6,7,11b - hexahydro-4H - pyrazino - [2,1-a] - isoquinoline precipitates as the dihydrochloride; M.P. 239–241° C.; yield: 11.5 g.

Analogously, there is obtained, from 2-$\beta$-aminoethyl-1,2,3,6,7,11b - hexahydro - 4H - pyrazino - [2,1-a] - isoquinoline, 2 - ($\beta$ - acetimido-aminoethyl) - 1,2,3,6,7,11b-hexahydro - 4H - pyrazino - [2,1-a] - isoquinoline, the trihydrochloride melting point being 195° C.

Example 15

1 g. 1-ethylaminomethyl-1,2,3,4-tetrahydroisoquinoline (obtained from 1 - N-acetylaminomethyl-1,2,3,4-tetrahydroisoquinoline and lithium aluminum hydride in ether) and 1 g. ethylene dibromide are boiled for 4 hours in n-butanol with the addition of 0.9 g. potassium carbonate, as is described in Example 1(b), worked up, and subsequently the crude base is converted into the hydrochloride. There is obtained 0.4 g. 2-ethyl-1,2,3,6,7,11b-hexahydro - 4H - pyrazino[2,1-a] - isoquinoline - dihydrochloride, M.P. 288–290° C. The product is identical with that set forth in Example 5.

Example 16

310 g. 1-benzamidomethyl-2-($\beta$-hydroxyethyl)-1,2,3,4-tetrahydroisoquinoline (obtained from 1-benzamidomethyl-1,2,3,4-tetrahydroisoquinoline with ethylene oxide according to the method of Example 3) are dissolved in 2.5 liter chloroform and mixed, while being cooled in an ice bath, with 180 g. thionyl chloride. The solution is left standing for 24 hours at room temperature and is treated with 60 ml. methanol. After distilling off the volatile components, the residue is stirred with benzene and 10% potassium bicarbonate solution. The reaction product is dissolved in benzene during this process. After separation and drying of the benzene solution, the benzene is distilled off. The residue is taken up in 700 ml. tert.butanol and mixed, at room temperature, with a soluion of 44 g. potassum in 1500 ml. tert.butanol. After two hours of stirring, the solution is concentrated under vacuum; the resultant mixture is then treated with water, and shaken out with chloroform. The chloroform solution is dried and concentrated, thereby crystallizing 245 g. of 2-benzoyl-1,2,3,6,7,11b - hexahydro - 4H - pyrazino-[2,1-a]-isoquinoline, M.P. 111–113° C.

From the mother liquor, there are obtained with ethereal hydrochloric acid 34 g. hydrochloride, M.P. 280–282° C. By heating the hydrochloride 5 hours with 20% hydrochloric acid at 100° C., the benzoyl group is split off, and there is quantitatively obtained 1,2,3,6,7,11b-hexahydro-4H - pyrazino - [2,1 - a] - isoquinoline - dihydrochloride, M.P. 320° C.

Example 17

82 g. 1,2,3,6,7,11b-hexahydro-4H-pyrazino-[2,1-a]-isoquinoline (racemate) are dissolved in 600 ml. methanol and boiled with a solution of 130 g. $d$-(—)-tartaric acid in 2000 ml. methanol. The precipitated salt is recrystallized from methanol/water, up to a constant melting point of 204–205° C. The compound (—)-1,2,3,6,7,11b-hexahydro - 4H - pyrazino - [2,1 - a] - isoquinoline is freed with solution of sodium hydroxide and is converted, with ethereal hydrochloric acid, to the dihydrochloride. M.P. 308° C.; $(\alpha)_D^{20}$—49.4° (in water). Yield: 25.6 g. The dihydrochloride of (+)-1,2,3,6,7,11b-hexahydro-4H-pyrazino-[2,1-a]-isoquinoline is obtained in an analogous manner from the racemic base with 1-(+)-tartaric acid, M.P. 308° C.; $(\alpha)_D^{20}$+48.8°.

Example 18

(+)- and (—)-1,2,3,6,7,11b-hexahydro-4H-pyrazino-[2,1-a]-isoquinoline, respectively, are converted, analogously to Example 2, with formaldehyde/formic acid into (+) - 2 - methyl - 1,2,3,6,7,11b - hexahydro - 4H - pyrazino-[2,1-a]-isoquinoline (dihydrochloride, M.P. 290–292° C.; $(\alpha)_D^{20}$+35.6°, in water) and (—)-2-methyl-1,2,3,6,7,11b - hexahydro - 4H - pyrazino-[2,1-a]-isoquinoline (dihydrochloride, M.P. 290–292° C.; $(\alpha)_D^{20}$—35.0°, in water), respectively.

Example 19

Analogously to Example 2, 2-cyclohexyl-1,2,3,6,7,11b-hexahydro - 4H - pyrazino-[2,1-a]-isoquinoline (dihydrochloride M.P. 205° C., is obtained from 1,2,3,6,7,11b-hexahydro-4H-pyrazino-[2,1-a]-isoquinoline with cyclohexanone and formic acid.

Example 20

Analogously to Example 6, there are produced from 1,2,3,6,7,11b-hexahydro - 4H - pyrazino-[2,1-a]-isoquinoline:

With benzoyl chloride, 2-benzoyl-1,2,3,6,7,11b-hexahydro-4H-pyrazino-[2,1-a]-isoquinoline, M.P. 111–113° C.;

With isobutyric acid chloride, 2-isobutyryl-1,2,3,6,7,11b-hexahydro - 4H - pyrazino - [2,1 - a] - isoquinoline - hydrochloride, M.P. 221° C.;

With pivalic acid chloride, 2-pivaloyl-1,2,3,6,7,11b-hexahydro-4H-pyrazino-[2,1-a]-isoquinoline - hydrochloride, M.P. 205° C.;

With chloro-formic acid ethyl ester, 2-ethoxy-carbonyl-1,2,3,6,7,11b - hexahydro - 4H - pyrazino - [2,1 - a] - isoquinoline, B.P. 145° C./0.05 mm.

Example 21

Analogously to Example 5, the following compounds are obtained from the corresponding amides (obtainable according to Example 20) with lithium aluminum hydride in ether or in tetrahydrofuran:

2 - benzyl - 1,2,3,6,7,11b - hexahydro - 4H - pyrazino-[2,1-a]-isoquinoline-dihydrochloride, M.P. 205–206° C.;

2 - isobutyl - 1,2,3,6,7,11b - hexahydro - 4H - pyrazino-[2,1-a]-isoquinoline-dihydrochloride, M.P. 284° C.;

2 - neopentyl - 1,2,3,6,7,11b - hexahydro - 4H - pyrazino-[2,1-a]-isoquinoline-dihydrochloride, M.P. 312° C.

Example 22

7 g. 2-($\beta$-hydroxyethyl)-1,2,3,6,7,11b-hexahydro-4H-pyrazino-[2,1-a]-isoquinoline are boiled for 3 hours with 5 g. enanthic acid chloride in 70 ml. toluene, in the presence of 4.6 g. potassium carbonate. The mixture is cooled, then mixed with water; the phases are separated, and from the organic phase the toluene is distilled off. The resultant organic residue is dissolved in absolute alcohol and converted, by ethereal hydrochloric acid, into 2-($\beta$-enanthoyloxyethyl) - 1,2,3,6,7,11b - hexahydro - 4H - pyrazino-[2,1-a]-isoquinoline-dihydrochloride, M.P. 226–228° C.

Example 23

A suspension of phenyl sodium is prepared from 7.8 finely dispersed sodium, 51 ml. absolute benzene, and 20.4 g. chlorobenzene. After 6 hours of stirring at room temperature, a mixture of 32 g. 1,2,3,6,7,11b-hexahydro-4H-pyrazino-[2,1-a]-isoquinoline and 19.1 g. chlorobenzene is added dropwise at 40–50° C. under cooling within 45 minutes, and the reaction mixture is stirred overnight at room temperature. First ethanol, then water is added dropwise, and the mixture is separated and the benzene phase is mixed with dilute aqueous hydrochloric acid; there is precipitated 2-phenyl - 1,2,3,6,7,11b-hexahydro - 4H-pyrazino - [2,1-a]-isoquinoline-hydrochloride, M.P. 223–224° C. (from isopropanol). Methoiodide, M.P. 270° C.

Example 24

5 g. 2 - (β-hydroxyethyl) - 1,2,3,6,7,11b-hexahydro-4H-pyrazino-[2,1-a]-isoquinoline in 50 ml. absolute benzene are boiled for 30 minutes with 2 g. 50% sodium amide-xylene suspension. 2.8 g. propargyl bromide are added in 10 ml. absolute benzene, stirring being carried out at a bath temperature of 100° C. The solution is cooled, treated with water, separated, and the organic solvents are removed. The residue is dissolved in absolute ethanol and converted, by means of ethereal hydrochloric acid, into 2 - (β-propargyloxyethyl) - 1,2,3,6,7,11b-hexahydro-4H-pyrazino - [2,1-a]-isoquinoline-dihydrochloride. M.P. 206–208° C. (from ethanol). Yield: 6.6 g.

Example 25

Analogously to Example 6, there is obtained, from 1,2,3,6,7,11b - hexahydro - 4H-pyrazino - [2,1-a]-isoquinoline and cyclopropane carboxylic acid chloride, 2-cyclopropylcarbonyl - 1,2,3,6,7,11b - hexahydro - 4H-pyrazino - [2,1-a]-isoquinoline-hydrochloride. M.P. 228–230° C.

Example 26

Analogously to Example 5, there is obtained from 2-cyclopropylcarbonyl - 1,2,3,6,7,11b - hexahydro - 4H-pyrazino-[2,1-a]-isoquinoline and lithium aluminum hydride in tetrahydrofuran, the compound 2-cyclopropylmethyl - 1,2,3,6,7,11b-hexahydro - 4H-pyrazino-[2,1-a]-isoquinoline-dihydrochloride, M.P. 267–269° C.

Example 27

Analogous to Example 7, the following compounds are obtained from 1,2,3,6,7,11b-hexahydro - 4H-pyrazino-[2,1-a]-isoquinoline:

With picolinic acid, 2-picolinoyl - 1,2,3,6,7,11b-hexahydro-4H-pyrazino-[2,1-a]-isoquinoline;

With nicotinic acid, 2 - nicotinoyl - 1,2,3,6,7,11b-hexahydro-4H-pyrazino-[2,1-a]-isoquinoline;

With isonicotinic acid, 2 - isonicotinoyl - 1,2,3,6,7,11b-hexahydro-4H-pyrazino-[2,1-a]-isoquinoline.

The following examples are such for suitable pharmaceutical preparations. The parts given are parts by weight.

Example A.—Tablets

| | Parts |
|---|---|
| 1,2,3,6,7,11b - hexahydro - 4H - pyrazino-[2,1-a]-isoquinoline dihydrochloride | 20 |
| Lactose | 100 |
| Corn starch | 20 |
| Talc | 10 | are thoroughly mixed. The obtained powder is pressed into tablets each containing 20 mg. of the active ingredient.

Example B.—Coated tablets

| | Parts |
|---|---|
| 1,2,3,6,7,11b - hexahydro - 4H - pyrazino-[2,1-a]-isoquinoline dihydrochloride | 15 |
| Lactose | 83 |
| Talc | 2 | are thoroughly mixed and pressed into tablets each containing 15 mg. of the active ingredient. These tablets are coated with sugar syrup in the customary manner until the total weight of one coated tablet is 200 mg.

Example C.—Solution for injections

A solution of 2 parts of 1,2,3,6,7,11b-hexahydro-4H-pyrazino - [2,1-a]-isoquinoline dihydrochloride in 1998 parts of distilled water is filled into 2 ml. ampoules in such a manner that each ampoule contains 2 mg. of the active ingredient.

Example D.—Syrup

The unit dosage contains:

| | Mg. |
|---|---|
| 1,2,3,6,7,11b - hexahydro - 4H - pyrazino-[2,1-a]-isoquinoline dihydrochloride | 20 |
| Sugar | 300 |
| Glycerol (twice distilled) | 500 |
| Methyl p-hydroxybenzoate | 3.3 |
| Propyl p-hydroxybenzoate | 1.7 |
| Water (distilled) | 4200 |
| Flavor, q.s. | |

Instead of 1,2,3,6,7,11b - hexahydro - 4H-pyrazino-[2,1-a]-isoquinoline dihydrochloride, other physiologically compatible salts of 1,2,3,6,7,11b-hexahydro-4H-pyrazino[2,1-a]-isoquinoline can be incorporated into similar pharmaceutical preparations.

Instead of the parent compound, the corresponding 2-substituted 1,2,3,6,7,11b - hexahydro - 4H - pyrazino-[2,1-a]-isoquinolines described above can be used.

By repeating the preceding examples, using the required starting materials, all of the specifically and generically described compounds can be produced.

So that there will be no misunderstanding, the following numbering system is employed for the over-all ring structure of this invention, the expression [2,1-a] referring, of course, to the point at which the pyrazine ring is fused to the isoquinoline ring, the latter description being based on the unfused rings, in connection with conventional organic chemistry nomenclature.

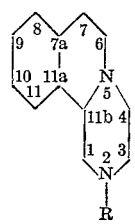

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A compound of the formula

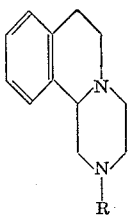

wherein R is a member selected from the group consisting of hydrogen, pyrazinoyl, propargyl, methyl, isopropyl, n-propyl and veratroyl.

2. 1,2,3,6,7,11b - hexahydro - 4H - pyrazino - [2,1-a]-isoquinoline.

3. 2 - methyl - 1,2,3,6,7,11b - hexahydro - 4H-pyrazino-[2,1-a]-isoquinoline.

4. 2-n-propyl-1,2,3,6,7,11b - hexahydro - 4H-pyrazino-[2,1-a]-isoquinoline.

5. 2-isopropyl-1,2,3,6,7,11b - hexahydro - 4H-pyrazino-[2,1-a]-isoquinoline.

6. 2-propargyl-1,2,3,6,7,11b-hexahydro - 4H - pyrazino-[2,1-a]-isoquinoline.

7. 2 - (3',5' - dimethoxybenzoyl) - 1,2,3,6,7,11b - hexahydro-4H-pyrazino-[2,1-a]-isoquinoline.

8. 2-pyrazinoyl-1,2,3,6,7,11b-hexahydro-4H - pyrazino-[2,1-a]-isoquinoline.

References Cited

Yamazaki, Pharmaceutical Society of Japan, vol. 79 (1959), pp. 1003, 1005 and 1007.

HENRY R. JILES, *Primary Examiner.*

UNITED STATES PATENT OFFICE
CERTIFICATE OF CORRECTION

Patent No. 3,393,195                                          July 16, 1968

Jan Thesing et al.

It is certified that error appears in the above identified patent and that said Letters Patent are hereby corrected as shown below:

Column 1, line 54, "nictotinoyl" should read -- nicotinoyl --. Column 4, line 18, "mediate" should read -- mediates --. Column 6, line 44, "methansulfonic" should read -- methanesulfonic --. Column 8, line 31, after "with" insert -- ethereal hydrochloric acid, the dihydrochloride, m.p. --; line 43, after "32.4 g." cancel "of"; same line 43, "tetrahydroquino" should read -- tetrahydroisoquino --. Column 10, line 28, "254" should read -- 253 --. Column 16, line 7, "5'" should read -- 4' --.

Signed and sealed this 24th day of February 1970.

(SEAL)
Attest:

Edward M. Fletcher, Jr.                                   WILLIAM E. SCHUYLER, JR.
Attesting Officer                                                   Commissioner of Patents